US009374515B2

(12) United States Patent
Chen et al.

(10) Patent No.: US 9,374,515 B2
(45) Date of Patent: Jun. 21, 2016

(54) ELECTRONIC ELEMENT SUPPORTING BASE AND ELECTRONIC DEVICE

(71) Applicant: HTC Corporation, Taoyuan County (TW)

(72) Inventors: I-Te Chen, Taoyuan County (TW); Wei-Cheng Liu, Taoyuan County (TW); Chun Tseng, Taoyuan County (TW); Jia-Yuan Hsu, Taoyuan County (TW); Jen-Cheng Lai, Taoyuan County (TW); Cheng-Chieh Chuang, Taoyuan County (TW); Chin-Kai Sun, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 69 days.

(21) Appl. No.: 14/324,082

(22) Filed: Jul. 4, 2014

(65) Prior Publication Data

US 2015/0249776 A1    Sep. 3, 2015

Related U.S. Application Data

(60) Provisional application No. 61/947,403, filed on Mar. 3, 2014.

(51) Int. Cl.
*H04N 5/225*     (2006.01)
*H04M 1/02*     (2006.01)
*H04M 1/18*     (2006.01)

(52) U.S. Cl.
CPC ........... *H04N 5/2257* (2013.01); *H04M 1/0264* (2013.01); *H04M 1/185* (2013.01); *H04N 5/2251* (2013.01); *H04N 5/2252* (2013.01)

(58) Field of Classification Search
CPC . H04N 5/2257; H04N 5/2251; H04M 1/0264; H04M 1/185
See application file for complete search history.

(56) References Cited

U.S. PATENT DOCUMENTS

2009/0052037 A1   2/2009   Wernersson
2010/0277640 A1   11/2010   Cao
(Continued)

FOREIGN PATENT DOCUMENTS

| CN | 101785296 | 7/2010 |
| JP | 2006154345 | 6/2006 |
| TW | 201025990 | 7/2010 |
| TW | 201039622 | 11/2010 |

OTHER PUBLICATIONS

"Office Action of European Counterpart Application", issued on Jun. 18, 2015, p. 1-p. 3.
(Continued)

*Primary Examiner* — Twyler Haskins
*Assistant Examiner* — Padma Haliyur
(74) *Attorney, Agent, or Firm* — Jianq Chyun IP Office

(57) ABSTRACT

An electronic element supporting base and an electronic device applying the same are provided. The electronic element supporting base comprises a fixing portion and a carrying part. The fixing portion is suitable for being fixed to a frame of the electronic device as a fulcrum for the electronic element supporting base. The carrying part is suitable for carrying a plurality of electronic elements, wherein a gap exists between the carrying part and the frame, and a gap exists between the carrying part and the circuit board. When the electronic device receives an impact, the suspended design of the electronic element supporting base allows the carrying part to oscillate through the gaps, and the electronic element supporting base will not be squeezed, which prevents the electronic elements on the electronic element supporting base from being shifted.

15 Claims, 4 Drawing Sheets

(56) References Cited

U.S. PATENT DOCUMENTS

2011/0249131 A1* 10/2011 Topliss ................. G02B 27/646
                                                        348/208.7
2011/0262121 A1  10/2011 Yanagisawa et al.

OTHER PUBLICATIONS

"Office Action of European Counterpart Application", issued on Jul. 23, 2015, p. 1-p. 7.

* cited by examiner

ELECTRONIC ELEMENT SUPPORTING BASE AND ELECTRONIC DEVICE

CROSS-REFERENCE TO RELATED APPLICATION

This application claims the priority benefits of U.S. provisional application Ser. No. 61/947,403, filed on Mar. 3, 2014. The entirety of the above-mentioned patent application is hereby incorporated by reference herein and made a part of this specification.

BACKGROUND

1. Field of the Invention

This disclosure relates to an electronic element supporting base and electronic device, and more specifically relates to an electronic element supporting base and electronic device capable of eliminating shift of optical axis.

2. Description of Related Art

In recent years, along with the development of industrial technology industry, electronic devices, for example products such as smart phones or tablet computers, are used on a regular basis in our daily life. In addition to the functions these electronic devices were meant to perform, they are also typically fitted with additional modules, possessing additional features. For example, an electronic device can be fitted with a camera module.

Presently, electronic devices typically fix the upper and lower ends of a camera by fixing means, while the surrounding sides are constricted by the chassis. However, in the circumstance when the electronic device receives an impact, the optical axis of the camera will shift along with the deformation of the fixing means. Some electronic devices have dual camera designs and is capable of evaluating a distance between an object and the cameras by performing triangulation calculations. This type of electronic devices has a higher requirement for parallelism of the optical axes. When a shift of optical axis occurs, error in the calculated distance becomes greater, and leads to satisfactory picture taking results.

SUMMARY

The disclosure provides a type of electronic element supporting base that is less prone to being squeezed by the housing when receiving an impact, preventing the components from being shifted.

The disclosure provides an electronic device having the above mentioned electronic element supporting base.

The electronic element supporting base of the present disclosure is suitable for being disposed in an electronic device, wherein the electronic device comprises a housing, a circuit board disposed within the housing, a frame disposed within the housing, and a plurality of electronic elements electrically coupled with the circuit board. The electronic element supporting base comprises a fixing portion and a carrying part. The fixing portion is suitable for being fixed to the frame as a fulcrum for the electronic element supporting base. The carrying part is suitable for carrying the plurality of electronic elements, wherein a gap respectively exists between the carrying part and the frame and between the carrying part and the circuit board.

The electronic device of the present disclosure comprises a housing, a circuit board, a frame, an electronic element supporting base, and a plurality of electronic elements. The circuit board and the frame are disposed in the housing. The electronic element supporting base disposed in the housing comprises a fixing portion and a carrying part, wherein the fixing portion is fixed to the frame as a fulcrum for the electronic element supporting base, and there exists a gap respectively between the carrying part and the frame and between the carrying part and the circuit board. The plurality of electronic elements are respectively arranged on the carrying part and electrically coupled with the circuit board.

Based on the above, the electronic element supporting base of the electronic device is fixed to the frame through a fulcrum of the fixing portion, and gaps exist between the carrying part and the frame and between the carrying part and the circuit board. When the electronic device receives an impact, the suspended design of the electronic element supporting base allows the carrying part to oscillate in relative to the frame and the circuit board through the gaps, and the electronic element supporting base will not be squeezed by the frame or the circuit board, which prevents the electronic elements on the electronic element supporting base from being shifted.

The following drawings are included to provide a further understanding of the disclosure, and are incorporated in and constitute a part of this specification.

DESCRIPTION OF EMBODIMENTS

Figure 1:
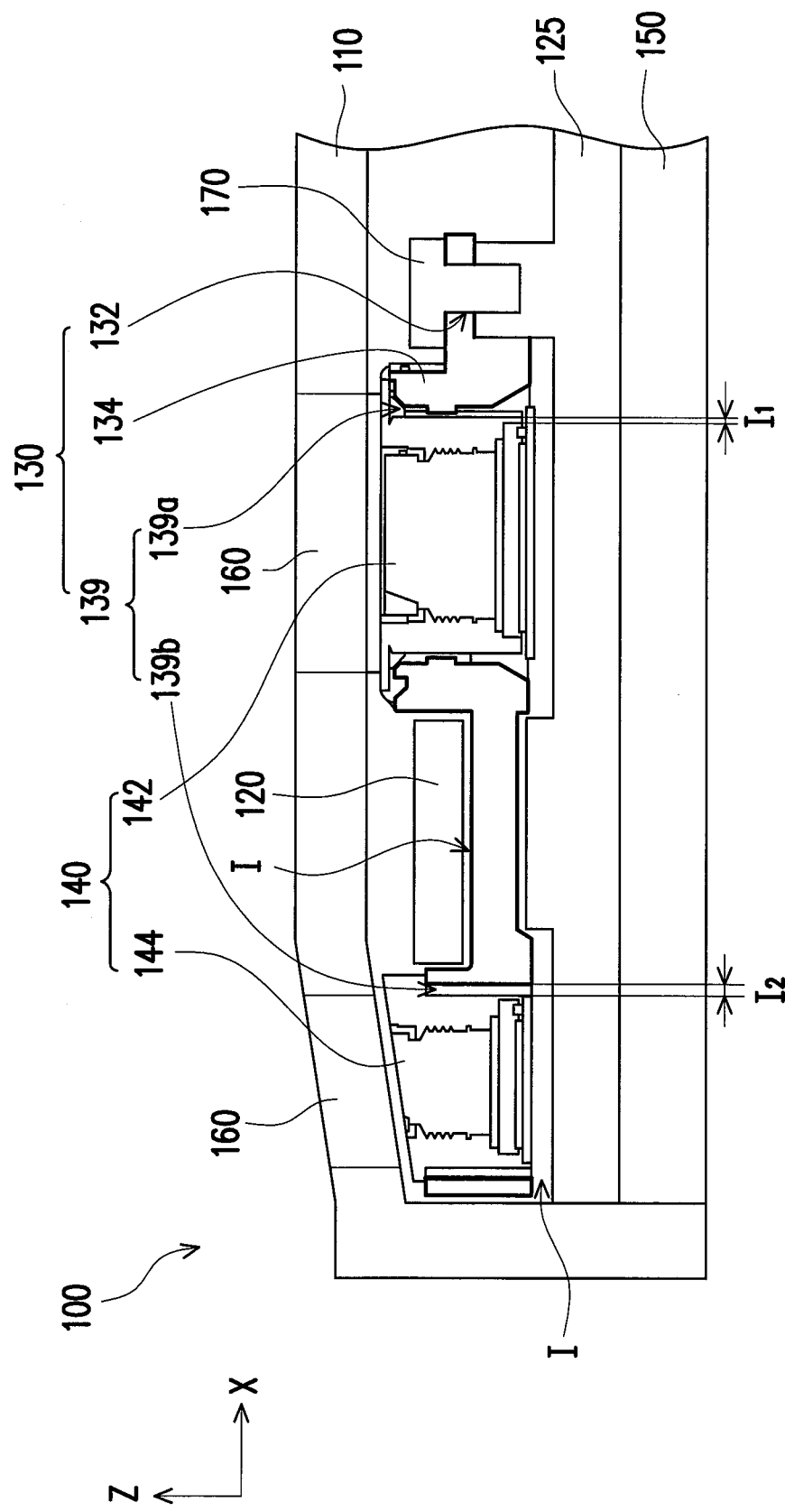
FIG. 1 is a partial cross-sectional view of an electronic device according to an embodiment of the disclosure.
Figure 2:
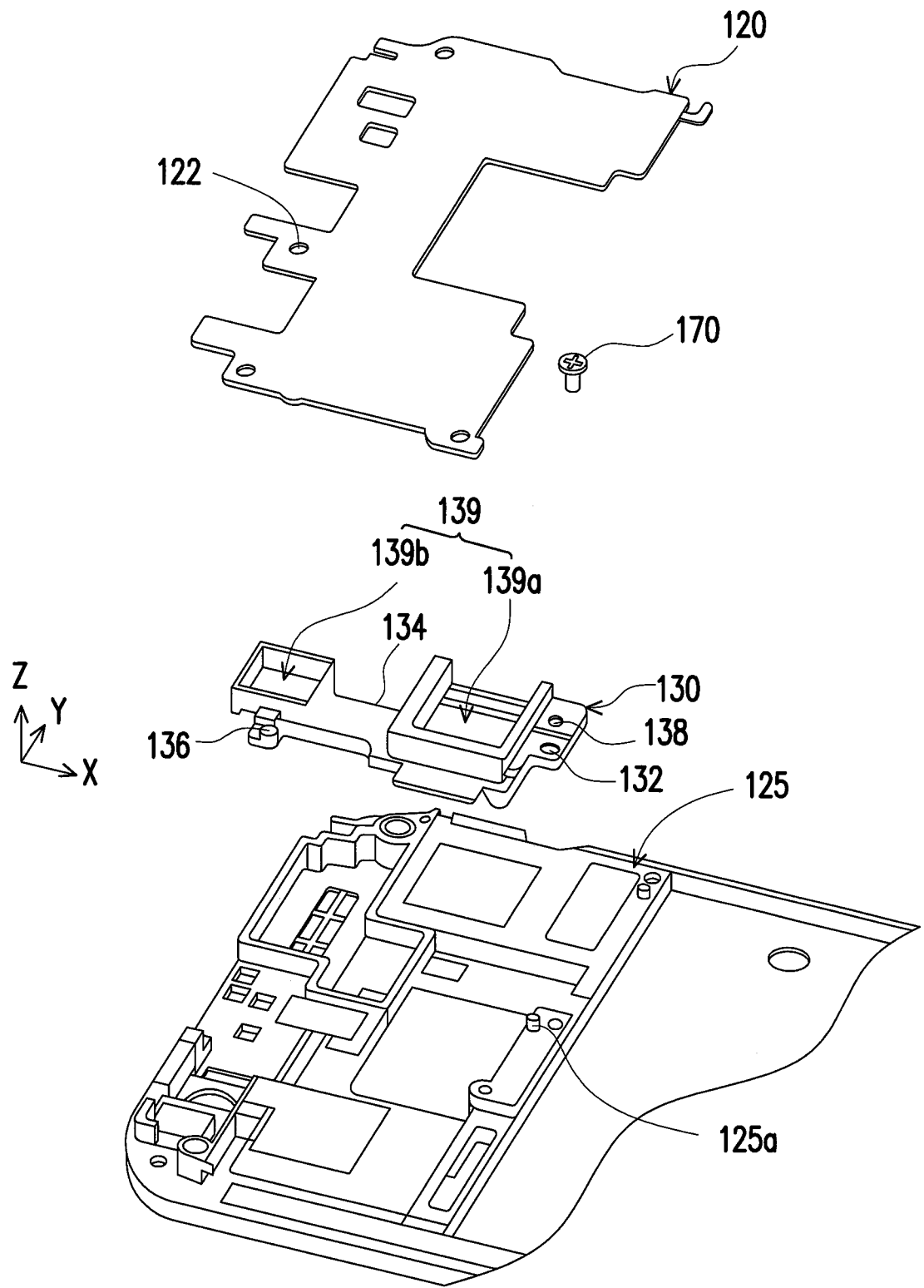
FIG. 2 is a partial exploded view of the electronic device of FIG. 1.
Figure 3:
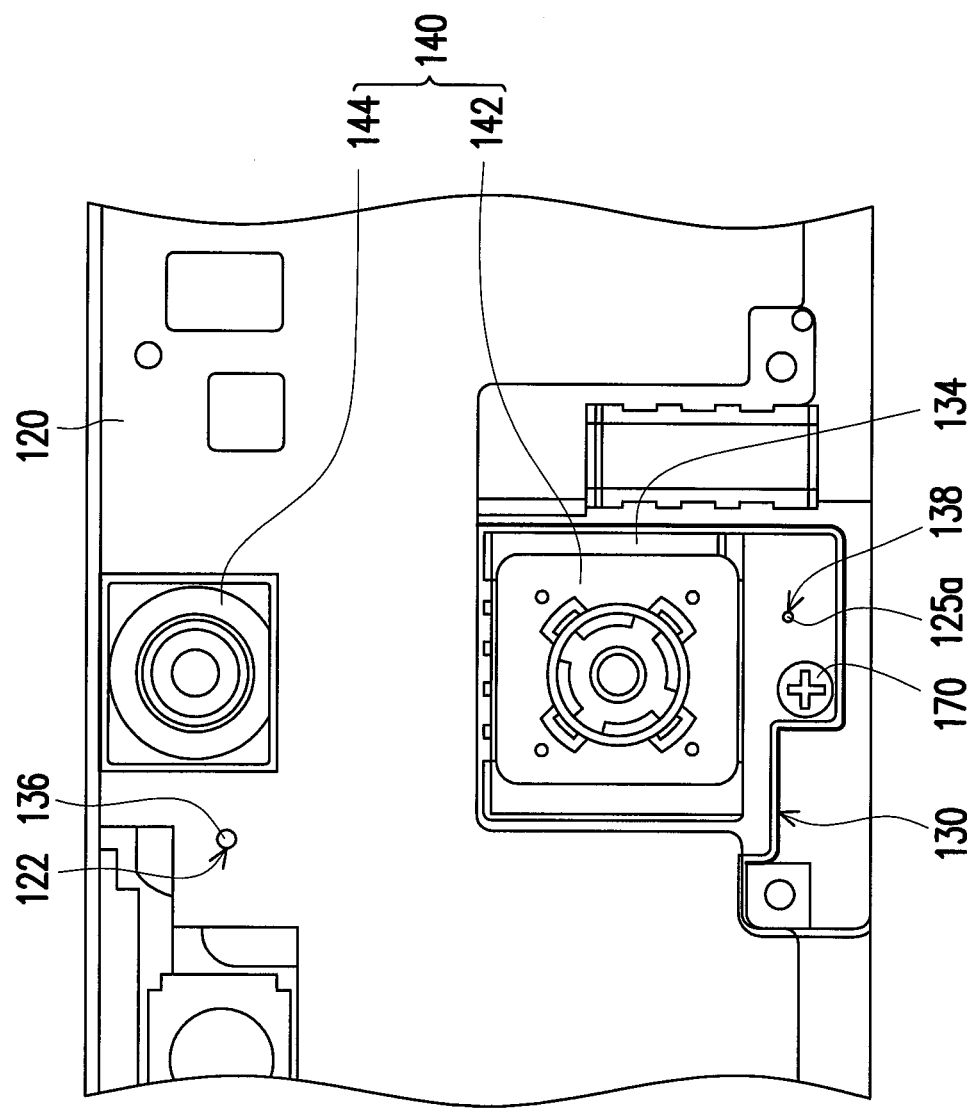
FIG. 3 is a partial view of the electronic device of FIG. 1 with the back cover removed and electronic elements hidden.

FIG. 1 is a partial cross-sectional view of an electronic device according to an embodiment of the disclosure. FIG. 2 is a partial exploded view of the electronic device of FIG. 1. FIG. 3 is a partial view of the electronic device of FIG. 1 with the back cover removed and electronic elements hidden. Referring to FIG. 1 through FIG. 3, the electronic device 100 of the embodiment comprises a housing 110, a circuit board 120, a frame 125, an electronic element supporting base 130, a plurality of electronic elements 140, a screen 150, a plurality of lenses 160 and a screw 170.

The circuit board 120, the frame 125, the electronic element supporting base 130 and the electronic elements 140 are disposed inside the housing 110. The screen 150 is exposed from the housing 110, and the lenses 160 are threaded into the housing 110 and located in opposite to the screen 150.

The electronic element supporting base 130 comprises a fixing portion 132 and a carrying portion 134. The fixing portion 132 is located at one end of the electronic element supporting base 130 and fixed to the frame 125. In the present embodiment, the fixing portion 132 is a through-hole, the screw 170 can be threaded through the fixing portion 132 then bolted to the frame 125, to fix the electronic element supporting base 130 to the frame 125. The carrying part 134 is used to carry the electronic elements 140, that is to say, the electronic elements 140 are installed to the frame 125 through the electronic element supporting base 130. The carrying part 134 has a plurality of accommodating slots 139 for accommodating the electronic elements 140. In the present embodiment, there are two accommodating slots 139, comprising a first accommodating slot 139a and a second accommodating slot 139b, while the number of accommodating slots 139 is not limited thereto. The electronic elements 140 are respectively arranged in the accommodating slots 139, electrically coupled with the circuit board 120 and placed nearby the lens 160. In the present embodiment, the number of electronic elements 140 corresponds with the number of accommodating slots 139, and is two, while in other embodiments, the number of electronic elements 140 can be varied to adapt with the number of accommodating slots 139, and is not limited thereto. The electronic element 140 can be a sensor, such as a camera module, an optical sensing module, a temperature sensing module, a distance sensing module and a magnetic sensing module, etc. For example, in the present embodiment, the two electronic elements 140 comprises a first camera module 142 and a second camera module 144. The bottom of the first camera module 142 is fixed to the first accommodating slot 139a, and the bottom of the second camera module 144 is fixed to the second accommodating slot 139b. The electronic device 100 can take 3D similar photo or support functions such as refocusing of images after they are taken through dual cameras.

Since the electronic device 100 with dual cameras have a high demand of parallelism of optical axis, to prevent the optical axes of dual cameras of the electronic device 100 from being shifted upon receiving an impact, in the present embodiment, the electronic element supporting base 130 carrying electronic elements 140 is fixed to the frame 125 by taking the fixing portion 132 as a fulcrum for the electronic element supporting base 130, and gaps I are formed respectively between the electronic element supporting base 130 and the frame 125, and between the electronic element supporting base 130 and the circuit board 120. In other words, the electronic element supporting base 130 maintains its position in relative to the frame 125 through the fixing portion 132, wherein most parts (e.g., the carrying part 134) excluding the fixing portion 132 of the electronic element supporting base 130 are basically in a suspended state. When the electronic device 100 receives an impact, the suspended design of electronic element supporting base 130 can allow the carrying part 134 to oscillate along the vertical direction (Z-direction) through the gap I between the frame 125 and the circuit board 120, and will not be squeezed directly by the frame 125 or the circuit board 120, to reduce the probability of the electronic elements 140 on the electronic element supporting base 130 from being shifted.

Additionally, in the present embodiment, the gap I1 between the side edge of the first camera module 142 and the first accommodating slot 139a is smaller than the gap I2 between the side edge of the second camera module 144 and the second accommodating slot 139b. The first camera module 142 and the second camera module 144 need to be precisely aligned. In the present embodiment, the first accommodating slot 139a has a shape more in line with the profile of the first camera module 142, and the second accommodating slot 139b has a shape slightly larger than the profile of the second camera module 144. After the first camera module 142 is fixed into the first accommodating slot 139a, the position of the second camera module 144 can be fine tuned in the second accommodating slot 139b. Then, after being positioned, the second camera module 144 is fixed, to achieve precise alignment results for the first camera module 142 and second camera module 144.

In other embodiments, the electronic elements 140 of the electronic device 100 can also be a camera module arranged with an optical sensing module, temperature sensing module, a distance sensing module or a magnetic sensing module arrangement. Of course, the above only provides some possible types of electronic elements 140 of electronic device 100 as reference, and the types of the numerous electronic elements 140 of the electronic device 100 is not limited to these.

Furthermore, in the present embodiment, the fixing portion 132 is located at one end of the electronic element supporting base 130, to allow the electronic element supporting base 130 to be fixed to the housing 110 as a cantilever. However, in other embodiments, the fixing portion 132 can also be located at the center of the electronic element supporting base 130, and the two accommodating slots 139 of carrying part 134 are positioned at the two ends of fixing portion 132. The two ends of the electronic element supporting base 130 can oscillate along the vertical direction (z-direction) similar to a seesaw, and of course, the relative position of fixing portion 134 on the electronic element supporting base 130 is not limited to the above mentioned.

Additionally, in order to prevent shift of the electronic element supporting base 130 in the horizontal direction (X-Y direction), as shown in FIG. 2, the electronic element supporting base 130 includes a first positioning part 136 and a third positioning part 138. The circuit board 120 comprises a second positioning part 122 corresponding to the first positioning part 136, and the frame 125 comprises a fourth positioning part 125a corresponding to the third positioning part 138. The first positioning part 136 and second positioning part 122 are used to position the electronic element supporting base 130 with the circuit board 120, and the third positioning part 138 and fourth positioning part 125a are used to position the electronic element supporting base 130 with the frame 125.

In the present embodiment, the first positioning part 136 is located on the end of electronic element supporting base 130 far away from the fixing portion 132, and the third positioning part 138 is positioned on the end of the electronic element supporting base 130 closer to the fixing portion 132. The first positioning part 136 of the electronic element supporting base 130 is a pillar, and the second positioning part 122 of the circuit board 120 is a hole. The third positioning part 138 of the electronic element supporting base 130 is a hole, and the fourth positioning part 125a of frame 125 is a pillar. The electronic element supporting base 130 uses the first positioning part 136 and third positioning part 138 to respectively align with the second positioning part 122 of the circuit board 120 and the fourth positioning part 125a of the frame 125, which limits the movement of the electronic element supporting base 130 in the horizontal direction with respect to the circuit board 120 and the housing 110.

Figure 4:
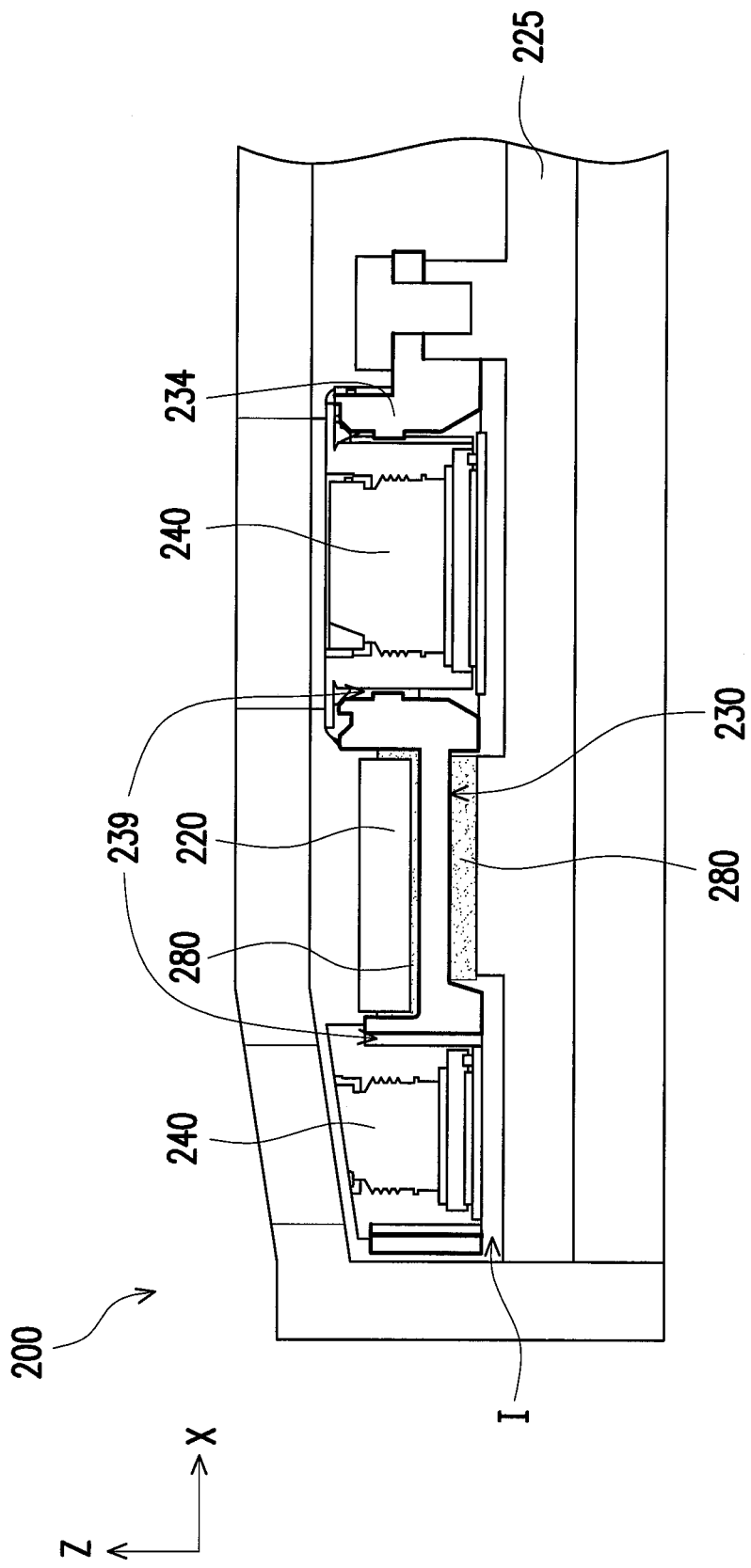
FIG. 4 is a partial cross-sectional view of an electronic device according to another embodiment of the disclosure.

FIG. 4 is a partial cross-sectional view of an electronic device according to another embodiment of the disclosure. Referring to FIG. 4, the main difference between the electronic device 200 of FIG. 4 and the electronic device 100 of FIG. 1 is that: in the electronic device 100 of FIG. 1, the parts of the electronic element supporting base 130, excluding the fixing portion 132, the first positioning part 136 and third positioning part 138, are basically suspended and do not come in contact with the frame 125 and the circuit board 120. In FIG. 4, the electronic device 200 further comprises a cushion material 280, arranged in at least one of the gap I between the carrying part 234 and the frame 225 and the gap I between the carrying part 234 and the circuit board 220.

As shown in FIG. 4, a part of the cushion material 280 is arranged in a part of the gap I between the carrying part 234 and frame 225, and another part of the cushion material 280 is arranged in the gap I between the carrying part 234 and circuit board 220. In more detail, the cushion material 280 is sandwiched between the frame 225 and the lower portion of the carrying part 234 that is between the two accommodating slots 239. In other words, the lower portion of the carrying part 234 between the two accommodating slots 239 lies on top of the cushion material 280. In the same way, the cushion material 280 is sandwiched between the circuit board 220 and the upper portion of carrying part 234 that is between the two accommodating slots 239.

The cushion material 280 can be soft materials that can be compressed, such as sponge, silicon, rubber, etc. In a general state, the cushion material 280 can provide the electronic element supporting base 230 with some fixing and supporting effect. When the electronic device 200 receives an impact, the frame 225 may slightly deform for an instant, at which time, since the carrying part 234 is not in contact with frame 225 and the circuit board 220, the carrying part 234 will not directly receive the impact of frame 225 and the circuit board 220 and deform. The feature of being slightly shifted in the vertical direction (Z-direction) of the suspended part of the electronic element supporting base 230 can be utilized to dissipate the impact energy received. Additionally, the cushion material positioned between the carrying part 234 and frame 225 and between the carrying part 234 and circuit board 220 can also absorb the impact force from the frame 225 and circuit board 220, to achieve a protective effect in preventing shift between the electronic elements 240 on the electronic element supporting base 230.

In summary, the electronic element supporting base of the electronic device of the disclosure uses the fixing portion as a fulcrum to be fixed to the frame. There exists a gap between the carrying part and the frame and between the carrying part and the circuit board. When the electronic device receives an impact, the suspended design of the electronic element supporting base can allow the carrying part to oscillate through the gap between the frame and the circuit board, and will not be squeezed directly by the frame or the circuit board, which prevents the electronic elements on the electronic element supporting base from being shifted. Furthermore, the electronic device of the disclosure uses the first positioning part and third positioning part of the electronic element supporting base, to respectively align with the second positioning part of the circuit board and the fourth positioning part of the frame, allowing the electronic element supporting base to align with the circuit board and the frame, and ensure the electronic element supporting base will not move in the horizontal direction, and can only oscillate in the vertical direction, which prevents interference between the electronic element supporting base and other elements in the horizontal direction and deformation of the electronic element supporting base when receiving an impact. Additionally the electronic device of the disclosure further uses cushion material arranged in the gap between the carrying part and the frame or the gap between the carrying part and the circuit board, to provide further support and cushion effect.

Although the invention has been disclosed using the embodiments above, however it is not intended to limit the scope of the invention, to a person skilled in the art it will be apparent that various modifications and variations can be made without departing from the scope or spirit of the invention, therefore it is intended that the invention cover modifications and variations of this invention provided they fall within the scope of the following claims and their equivalents.

What is claimed is:

1. An electronic element supporting base, suitable for being disposed in an electronic device, wherein the electronic device comprises a housing, a circuit board disposed within the housing, a frame disposed within the housing, and a plurality of electronic elements electrically coupled with the circuit board, the electronic element supporting base comprising:
   a fixing portion, suitable for being fixed to the frame as a fulcrum for the electronic element supporting base; and
   a carrying part, for carrying the plurality of electronic elements, wherein a gap exists respectively between the carrying part and the frame and between the carrying part and the circuit board, wherein the electronic element supporting base is disposed between the housing and the circuit board, and the carrying part has a plurality of accommodating slots for accommodating the plurality of electronic elements.

2. The electronic element supporting base as claimed in claim 1, wherein the fixing portion is positioned at one end of the electronic element supporting base, such that the electronic element supporting base is fixed to the frame in a cantilever manner.

3. The electronic element supporting base as claimed in claim 1, wherein each of the plurality of electronic elements comprises a sensor.

4. The electronic element supporting base as claimed in claim 1, wherein the electronic element supporting base comprises a first positioning part, and the circuit board or the frame comprises a second positioning part corresponding to the first positioning part, for aligning the electronic element supporting base with the circuit board or the frame.

5. The electronic element supporting base as claimed in claim 4, wherein the first positioning part is positioned at one end of the electronic element supporting base, one of the first positioning part and the second positioning part is a protruding pillar, and the other one of the first positioning part and the second positioning part is a hole.

6. The electronic element supporting base as claimed in claim 1, wherein the plurality of accommodating slots comprises a first accommodating slot and a second accommodating slot, and the plurality of electronic elements comprises a first camera module and a second camera module, wherein a bottom of the first camera module is fixed to the first accommodating slot, a bottom of the second camera module is fixed to the second accommodating slot, and a gap between a side edge of the first camera module and the first accommodating slot is smaller than a gap between a side edge of the second camera module and the second accommodating slot.

7. The electronic element supporting base as claimed in claim 1, further comprising a cushion material arranged in at least one of the gap between the carrying part and the frame and the gap between the carrying part and the circuit board.

8. An electronic device comprising:
   a housing;
   a circuit board, disposed in the housing;
   a frame, disposed in the housing;
   an electronic element supporting base, disposed in the housing and disposed between the housing and the circuit board, the electronic element supporting base comprising a fixing portion and a carrying part, wherein the fixing portion is fixed to the frame as a fulcrum for the electronic element supporting base, and there exists a gap respectively between the carrying part and the frame and between the carrying part and the circuit board; and
   a plurality of electronic elements, respectively arranged on the carrying part and electrically coupled with the circuit board, wherein the carrying part has a plurality of accommodating slots for accommodating the plurality of electronic elements.

9. The electronic device as claimed in claim 8, wherein the fixing portion is positioned on an end of the electronic element supporting base, such that the electronic element supporting base is fixed to the frame in a cantilever manner.

10. The electronic device as claimed in claim 8, wherein each of the electronic elements comprises a sensor.

11. The electronic device as claimed in claim 8, wherein the electronic element supporting base comprises a first positioning part, and the circuit board or the frame comprises a second positioning part corresponding to the first positioning part, for aligning the electronic element supporting base with the circuit board or the frame.

12. The electronic device as claimed in claim 11, wherein the first positioning part is positioned at one end of the electronic element supporting base, one of the first positioning part and the second positioning part is a protruding pillar, and the other one of the first positioning part and the second positioning part is a hole.

13. The electronic device as claimed in claim 8, further comprising a plurality of lenses, wherein the housing comprises a back cover, the plurality of lenses are threaded in the back cover, and the plurality of electronic elements respectively lean against the plurality of lenses.

14. The electronic device as claimed in claim 8, further comprising a cushion material, arranged in at least one of the gap between the carrying part and the frame and the gap between the carrying part and the circuit board.

15. The electronic device as claimed in claim 8, wherein the plurality of accommodating slots comprises a first accommodating slot and a second accommodating slot, and the plurality of electronic elements comprises a first camera module and a second camera module, wherein a bottom of the first camera module is fixed to the first accommodating slot, a bottom of the second camera module is fixed to the second accommodating slot, and a gap between a side edge of the first camera module and the first accommodating slot is smaller than a gap between a side edge of the second camera module and the second accommodating slot.

* * * * *